(12) United States Patent
Maruyama

(10) Patent No.: US 6,757,172 B2
(45) Date of Patent: Jun. 29, 2004

(54) ELECTRONIC APPARATUS HAVING HOLDER LOADED WITH SD CARD

(75) Inventor: Takeshi Maruyama, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/234,167

(22) Filed: Sep. 5, 2002

(65) Prior Publication Data

US 2003/0117783 A1 Jun. 26, 2003

(30) Foreign Application Priority Data

Dec. 25, 2001 (JP) .......................................... 2001-392671

(51) Int. Cl.[7] .................................................. H05K 7/12
(52) U.S. Cl. ........................ 361/737; 759/747; 759/732; 759/740; 759/801; 759/726
(58) Field of Search .................................. 361/726, 732, 361/801, 730, 737, 740, 747, 752, 754, 756, 759, 748; 70/85, 95; 312/222

(56) References Cited

U.S. PATENT DOCUMENTS

| 4,774,399 | A | * | 9/1988 | Fujita et al. ................. 235/441 |
| 5,140,138 | A | * | 8/1992 | Tanaka ....................... 235/1 D |
| 5,933,328 | A | * | 8/1999 | Wallace et al. .............. 361/737 |
| 6,075,706 | A | * | 6/2000 | Learmonth et al. .......... 361/737 |
| 6,195,054 | B1 | * | 2/2001 | Washino et al. ............. 343/702 |
| 6,226,189 | B1 | * | 5/2001 | Haffenden et al. ........... 361/814 |
| 6,293,464 | B1 | * | 9/2001 | Smalley, Jr. ................. 235/451 |
| 2002/0036896 | A1 | * | 3/2002 | Matsumoto .................. 361/752 |

FOREIGN PATENT DOCUMENTS

| JP | 53-34893 | 9/1978 |
| JP | 4-291692 | 10/1992 |
| JP | 3078227 | 3/2001 |

* cited by examiner

Primary Examiner—David Martin
Assistant Examiner—Dameon E. Levi
(74) Attorney, Agent, or Firm—Finnegan, Henderson, Farabow, Garrett & Dunner, L.L.P.

(57) ABSTRACT

An electronic apparatus comprises a body and a holder for holding a card. The holder is supported on the body, and is movable between a first position in which it is held in the body and a second position in which it is disengaged from the body. The body has an engaging portion. The engaging portion is removably caught by the card in the holder when the holder is rocked to the first position.

9 Claims, 6 Drawing Sheets

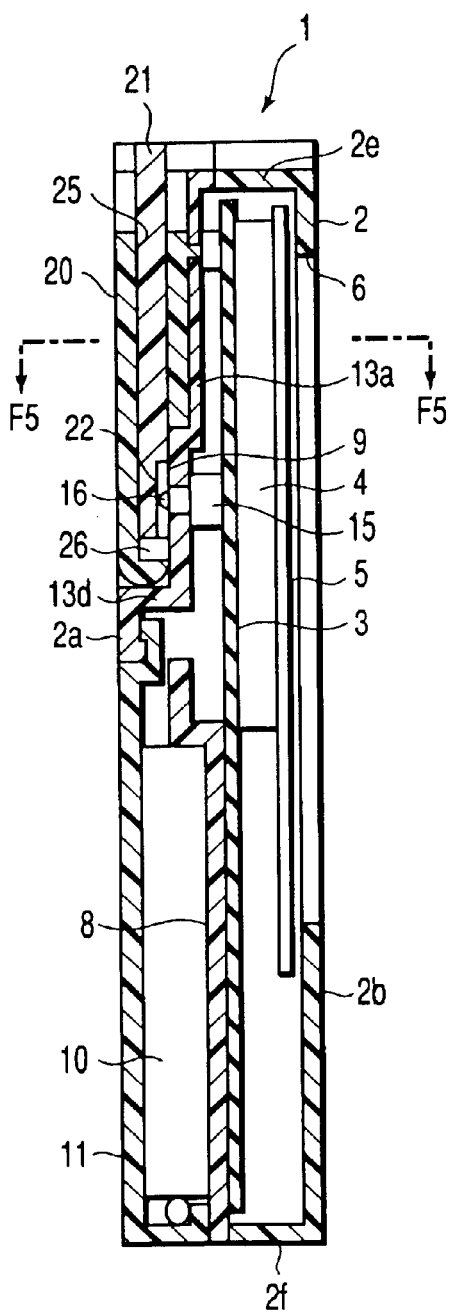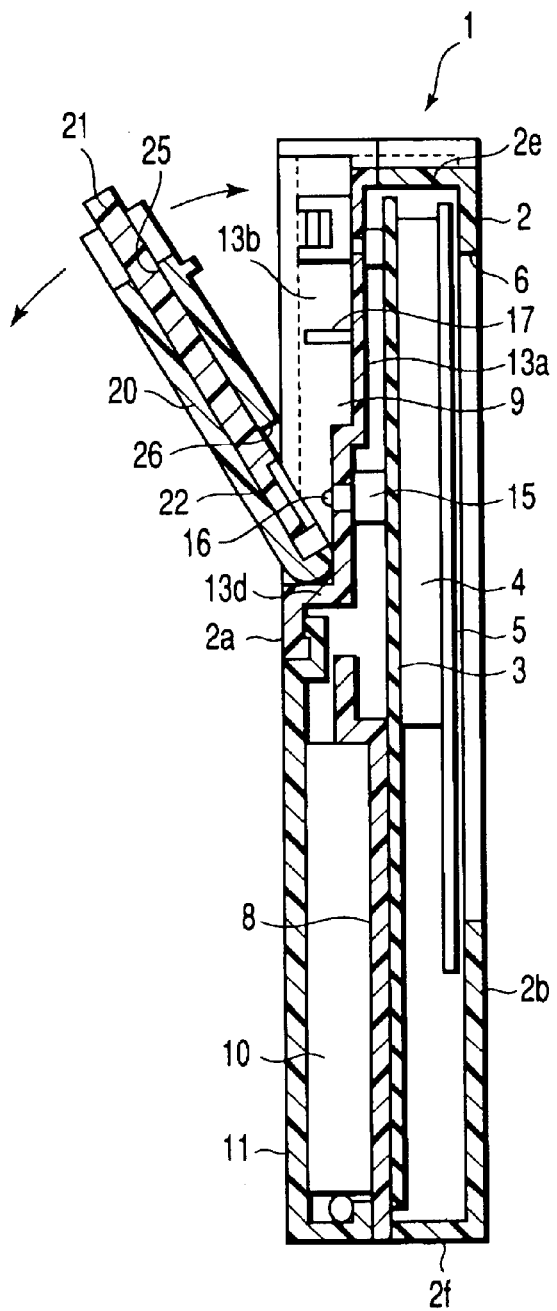
FIG. 3
FIG. 4

ELECTRONIC APPARATUS HAVING HOLDER LOADED WITH SD CARD

CROSS-REFERENCE TO RELATED APPLICATIONS

This application is based upon and claims the benefit of priority from the prior Japanese Patent Application No. 2001-392671, filed Dec. 25, 2001, the entire contents of which are incorporated herein by reference.

BACKGROUND OF THE INVENTION

1. Field of the Invention

The present invention relates to electronic apparatus capable of being loaded with, for example, an SD (secure digital) card, and more specifically, to a structure for preventing the SD card from slipping off.

2. Description of the Related Art

SD cards that can store masses of image, voice, and other data are widely used in electronic apparatuses such as portable computers and PDAs (personal digital assistants).

An electronic apparatus that can be loaded with an SD card is furnished with a card receptacle. The card receptacle comprises a card slot into which the SD card can be inserted, a card connector that faces the card slot, and a locking mechanism for holding the SD card in the card receptacle.

The locking mechanism has a metallic lock lever. The lock lever is located between the card slot and the card connector. The lock lever has an elastically deformable tongue portion on its distal end, the tongue portion projecting into the card receptacle. When the SD card is inserted into the card receptacle through the card slot, the tongue portion is elastically fitted into a notch that is formed in a side edge of the card. Thus, the SD card can be held in the card receptacle without the possibility of its slipping off.

If the SD card is drawn out of the card slot, the tongue portion of the lock lever is elastically deformed, yielding to the pull, and is disengaged from the notch. Thereupon, the SD card is released from the locking lever and unlocked, so that it can be taken out of the card receptacle.

According to the locking mechanism, the tongue portion of the lock lever rubs against the side edge of the SD card every time the card is inserted into or drawn out of the card receptacle. At the same time, the tongue portion is fitted into the notch of the card or elastically deformed in a direction such that it slips out of the notch.

If the insertion and removal of the SD card are repeated, therefore, the tongue portion of the lock lever inevitably wears or is lowered in springiness. In consequence, the engagement between the tongue portion of the lock lever and the notch of the SD card may possibly be deficient. Thus, the SD card easily slips off the card receptacle if any vibration or shock acts on the electronic apparatus, for example.

BRIEF SUMMARY OF THE INVENTION

The embodiment of the present invention provides an electronic apparatus capable of securely holding a card in a holder and preventing the card from slipping off unexpectedly.

In order to achieve the above embodiment, an electronic apparatus according to the invention comprises a body and a holder for holding a card. The holder is supported on the body, and is movable between a first position in which the holder is held in the body and a second position in which the holder is disengaged from the body. The body has an engaging portion. The engaging portion is removably caught by the card in the holder when the holder is moved to the first position.

In incorporating the card into the body with this configuration, the holder is moved to the second position. After the holder is then loaded with the card, it is moved from the second position to the first position. As this is done, the engaging portion is caught by the card, and the card is locked by means of the holder.

In taking out the card from the body, the holder is moved from the first position to the second position. As this is done, the card, along with the holder, recedes from the body and is disengaged from the engaging portion of the body. Thus, the card is unlocked.

When the card is incorporated into or removed from the body, according to this configuration, no components rub against it or undergo elastic deformation. Thus, the card can be prevented from being deficiently locked owing to abrasion of the components or lowering of their springiness.

Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a sectional view of the PDA according to the first embodiment with a cardholder, having an SD card therein, in its first position;

FIG. 4 is a sectional view of the PDA according to the first embodiment with the cardholders having the SD card therein, in its second position;

DETAILED DESCRIPTION OF THE INVENTION

Figure 2:
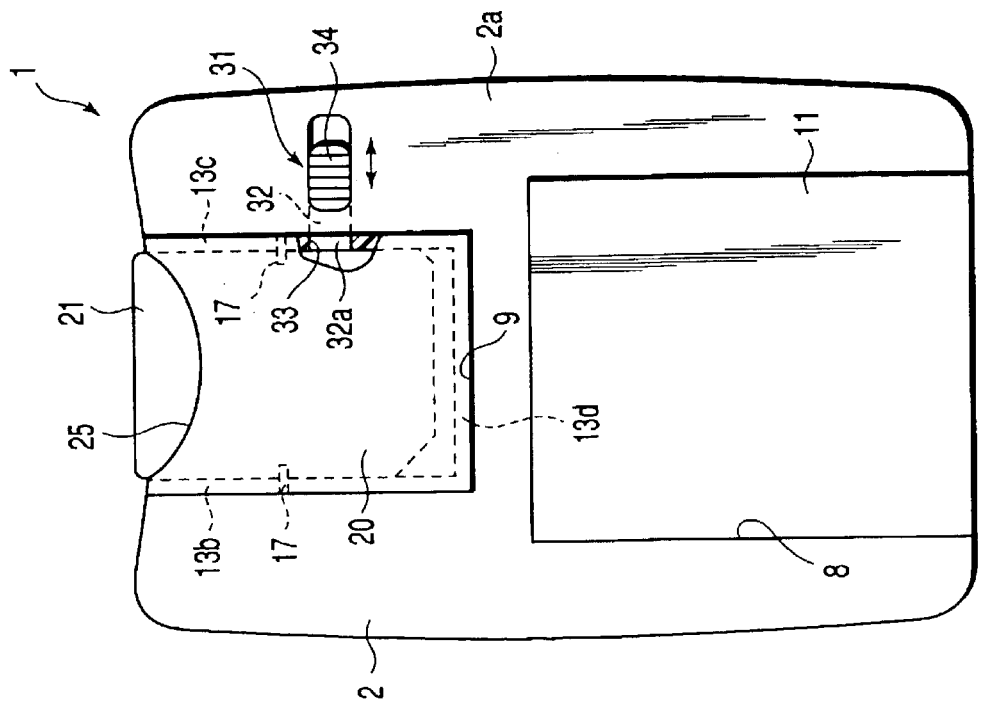
FIG. 2 is a rear view of the PDA according to the first embodiment of the invention.

A first embodiment of the present invention will now be described with reference to FIGS. 1 to 9.

FIGS. 1 to 4 show a PDA (personal digital assistant) 1 as an electronic apparatus. The PDA 1 has a plastic apparatus body 2. The body 2 is in the form of a flat box that has a bottom wall 2a, front wall 2b, left- and right-hand sidewalls 2c and 2d, upper end wall 2e, and lower end wall 2f.

Figure 1:
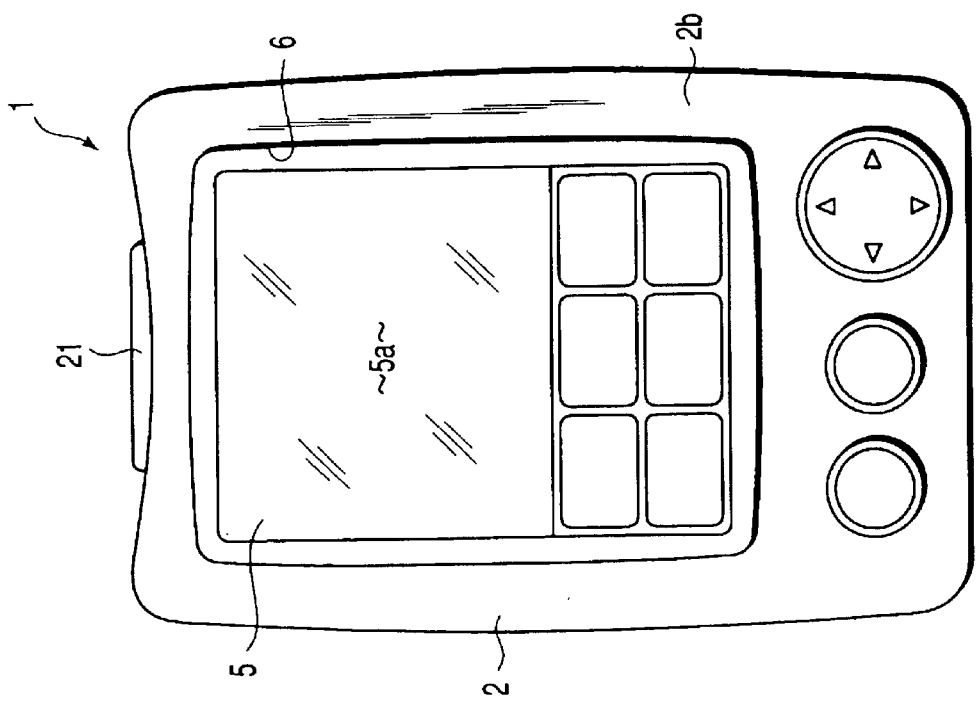
FIG. 1 is a front view of a PDA (personal digital assistant) according to a first embodiment of the invention.
Figure 5:
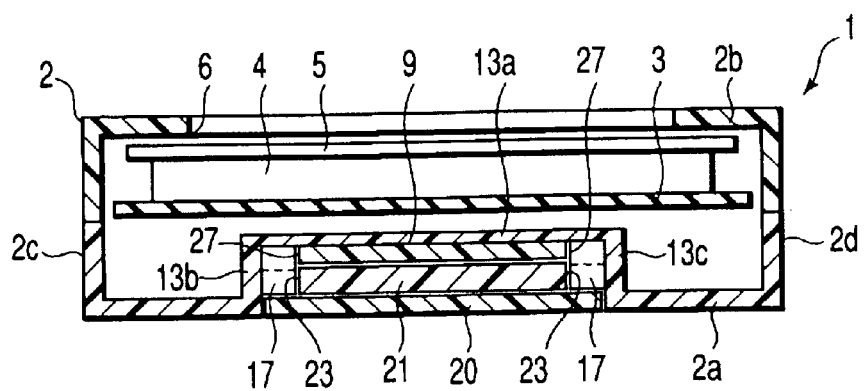
FIG. 5 is a sectional view taken along line F5—F5 of FIG. 3.

The apparatus body 2 contains a printed wiring board 3 therein. The printed wiring board 3 is located parallel to the bottom and front walls 2a and 2b of the body 2. A liquid crystal display unit 4 and a tablet 5 are held between the printed wiring board 3 and the front wall 2b. The display unit 4 and the tablet 5 overlap each other. The tablet 5 has a screen 5a, as shown in FIG. 1. The screen 5a is exposed to the outside of the body 2 through an opening 6 in the front wall 2b.

The apparatus body 2 is provided with a battery storage portion 8 and a holder supporting portion 9. The battery storage portion 8 is used to store batteries 10 for use as power sources for the PDA 1. The storage portion 8 is formed of a recess that opens in the bottom wall 2a and the lower end wall 2f of the body 2 and is closed by means of a removable battery cover 11.

The holder supporting portion 9 is situated behind the liquid crystal display unit 4 and in the upper half of the apparatus body 2. The supporting portion 9 is formed of a recess in the body 2, which opens in the bottom wall 2a and the upper end wall 2e of the body 2. The holder supporting portion 9 has a bottom wall 13a, left- and right-hand sidewalls 13b and 13c, and an end wall 13d. The bottom wall 13a is located parallel to the printed wiring board 3. The sidewalls 13b and 13c and the end wall 13d rise individually from the edge portions of the bottom wall 13a toward the bottom wall 2a of the body 2.

As shown in FIGS. 3 and 4, a card connector 15 is mounted on the printed wiring board 3. The card connector 15 has connecting terminals 16. The terminals 16 are arranged in a line in the width direction of the apparatus body 2 and exposed to the holder supporting portion 9 through the bottom wall 13a.

The holder supporting portion 9 has a pair of engaging projections 17. The projections 17 are situated individually in two corner portions that are defined by the bottom wall 13a and the sidewalls 13b and 13c. The projections 17 protrude from the walls 13a, 13b and 13c at right angles thereto toward the inner part of the supporting portion 9.

Figure 9:
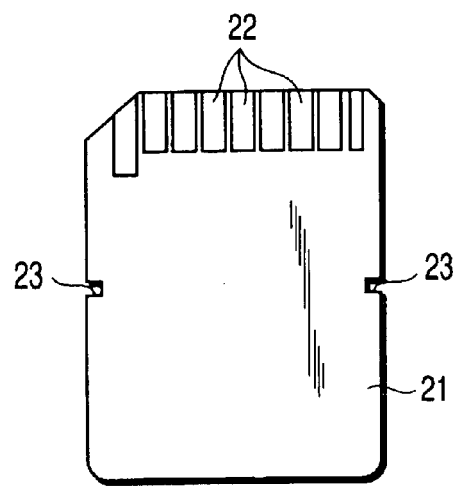
FIG. 9 is a plan view of the SD card.

As shown in FIGS. 2 to 5, the holder supporting portion 9 of the apparatus body 2 supports a plastic cardholder 20. The cardholder 20 is used to hold an SD (secure digital) card 21 in a removable manner. As shown in FIG. 9, the SD card 21 has contacts 22 and a pair of notches 23. The contacts 22 are situated on one end portion of the SD card 21 and arranged in a line in the width direction of the card 21. The notches 23 are situated individually in the respective middle portions of the left- and right-hand side edges of the SD card 21. The notches 23 are just large enough to receive their corresponding projections 17.

The cardholder 20 that holds the SD card 21 is in the form of a flat box that can be fitted tight in the holder supporting portion 9. The cardholder 20 has a card slot 25 for the insertion and removal of the SD card 21 and an opening 26 through which the contacts 22 of the card 21 can be exposed. The card slot 25 is situated at one end of the cardholder 20. The opening 26 is situated at the other end of the cardholder 20 opposite from the card slot 25, and faces the connecting terminals 16 of the card connector 15 that are exposed to the holder supporting portion 9.

Figure 7:
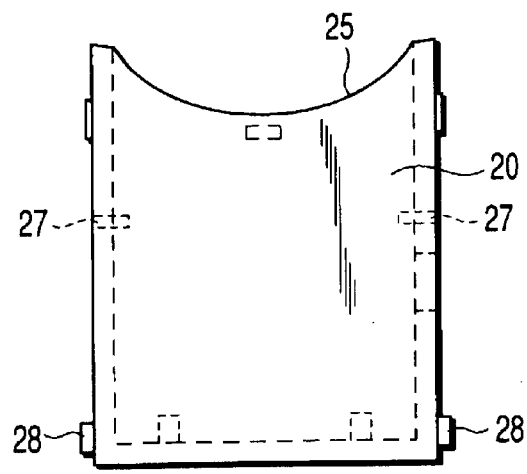
FIG. 7 is a front view of the cardholder.
Figure 8:
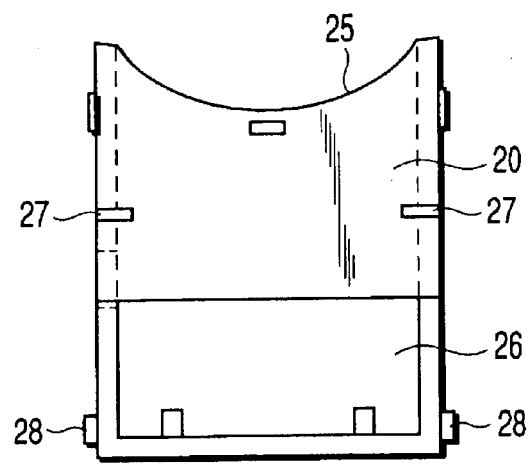
FIG. 8 is a rear view of the cardholder.

Further, the cardholder 20 has a pair of through holes 27, as shown in FIGS. 7 and 8. The through holes 27 are situated individually in the left- and right-hand portions of the cardholder 20. Each through hole 27 is in the form of a slit that is just large enough for the passage of each corresponding engaging projection 17. The through holes 27 can be aligned individually with the notches 23 of the SD card 21 when the card 21 is inserted in the card slot 25.

The cardholder 20 has a pair of shafts 28 on its other end. The shafts 28 are fitted individually in sockets 29 that are bored individually in the sidewalls 13b and 13c of the holder supporting portion 9. Thus, the cardholder 20 is supported on the apparatus body 2 by means of the shafts 28 so as to be rockable between first and second positions.

FIGS. 2 and 3 show the cardholder 20 in the first position. In this first position, the cardholder 20 is held in the holder supporting portion 9. Accordingly, the cardholder 20 overlaps the bottom wall 13a, and its opening 26 faces the connecting terminals 16 of the card connector 15. As long as the cardholder 20 is in the first position, moreover, the engaging projections 17 of the holder supporting portion 9 are located in their corresponding through holes 27 and inside the cardholder 20.

FIG. 4 shows the cardholder 20 in the second position. In this second position, the cardholder 20 is tilted away from the bottom wall 13a of the holder supporting portion 9 and juts out from the bottom wall 2a of the apparatus body 2. Accordingly, the card slot 25 of the cardholder 20 outwardly projects long from the holder supporting portion 9, and the engaging projections 17 of the supporting portion 9 are disengaged from the through holes 27 of the cardholder 20.

Figure 6:
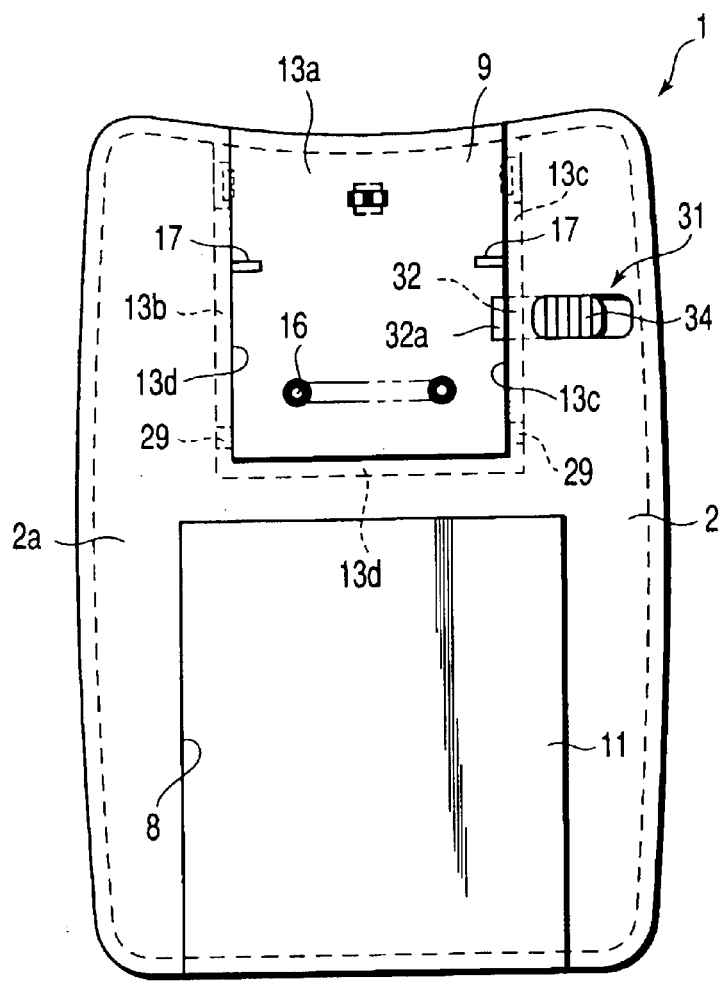
FIG. 6 is a rear view of the PDA according to the first embodiment, showing a holder supporting portion of an apparatus body cleared of the cardholder.

As seen from FIGS. 2 and 6, the apparatus body 2 is provided with a locking mechanism 31 for locking the cardholder 20 in the first position. The locking mechanism 31 includes a locking tongue 32 that is supported on the bottom wall 2a of the body 2. The tongue 32 has a distal end 32a that adjoins the holder supporting portion 9. The locking tongue 32 can slide between a locking position and an unlocking position. When the locking tongue 32 is slid to the locking position, its distal end 32a advances into the holder supporting portion 9 through the sidewall 13c. When the tongue 32 is slid to the unlocking position, the distal end 32a withdraws from the holder supporting portion 9 into the body 2.

If the locking tongue 32 is slid to the locking position when the cardholder 20 is in the first position, its distal end 32a is caught by an engaging hole 33 in the right-hand side portion of the cardholder 20. Thus, the cardholder 20 is restricted from rocking freely and is locked in the first position.

If the locking tongue 32 is slid from the locking position to the unlocking position when the cardholder 20 is in the first position, its distal end 32a is disengaged from the engaging hole 33. Thus, the cardholder 20 is unlocked or released from the locking tongue 32, so that it can be rocked from the first position to the second position.

The locking tongue 32 has an operating part 34. The operating part 34 is exposed to the outside of the bottom wall 2a of the apparatus body 2 so that it is accessible to an operator's fingertip. Thus, the operator can manually slide the locking tongue 32 to the locking or unlocking position.

The following is a description of steps of procedure for incorporating the SD card 21 into the PDA 1 arranged in this manner.

First, the locking tongue 32 is slid from the locking position to the unlocking position, whereupon the cardholder 20 is unlocked or released from the locking tongue 32. Then, the cardholder 20 is rocked from the first position to the second position, whereupon it is lifted from the holder supporting portion 9. In this state, the SD card 21 is put into the card slot 25 of the cardholder 20. The card 21 is inserted into the cardholder 20 with its one end, having the contacts 22, at the head.

When the SD card 21 is fully inserted into the cardholder 20, the contacts 22 are exposed to the outside of the cardholder 20 through the opening 26. At the same time, the notches 23 of the card 21 are aligned individually with the through holes 27 of the cardholder 20.

Then, the cardholder 20 is rocked from the second position to the first position. As this is done, the contacts 22 of the SD card 21 run against the connecting terminals 16 of the card connector 15 so that it is connected electrically to the printed wiring board 3. Subsequently, the cardholder 20 approaches the bottom wall 13a of the holder supporting portion 9, and the engaging projections 17 that protrude from the bottom wall 13a get into the notches 23 of the SD card 21 through the through holes 27, individually. Thereupon, the respective positions of the SD card 21 and the cardholder 20 are fixedly settled, and the card 21 is locked lest it slip out of the cardholder 20.

Finally, the locking tongue 32 is slid from the unlocking position to the locking position. As this is done, the distal end 32a of the locking tongue 32 is caught by the engaging hole 33 of the cardholder 20, whereupon the cardholder 20 is locked in the first position.

In taking out the SD card 21 from the PDA 1, the locking tongue 32 is slid from the locking position to the unlocking position to unlock the cardholder 20. Then, the cardholder 20 is rocked from the first position to the second position. As this is done, the cardholder 20 recedes from the bottom wall 13a of the holder supporting portion 9, and the engaging projections 17 of the supporting portion 9 get out of the notches 23 of the SD card 21 and the through holes 27 of the cardholder 20, individually. Thus, the SD card 21 is unlocked and disengaged from the cardholder 20.

At the same time, the contacts 22 of the SD card 21 leave the connecting terminals 16 of the card connector 15, whereupon the card 21 is released from the electrical connection with the printed wiring board 3. When the cardholder 20 reaches the second position, the card slot 25 outwardly projects long from the apparatus body 2, whereupon the SD card 21 is allowed to be drawn out of the card slot 25.

As the cardholder 20 having the SD card 21 therein is rocked, according to the PDA 1 constructed in this manner, the engaging projections 17 of the apparatus body 2 get individually into the notches 23 of the card 21, thereby locking the card 21 in the cardholder 20, or slip out of the notches 23, thereby unlocking the card 21.

When the SD card 21 is locked or unlocked, therefore, no components rub against it or undergo elastic deformation. Thus, the card 21 can be prevented from being deficiently locked owing to abrasion of the components or lowering of their springiness. In consequence, the card 21 never unexpectedly slips off the PDA 1 if the PDA 1 is subjected to any vibration or shock. Thus, the SD card 21 can be prevented from being rendered missing or damaged.

Figure 10:
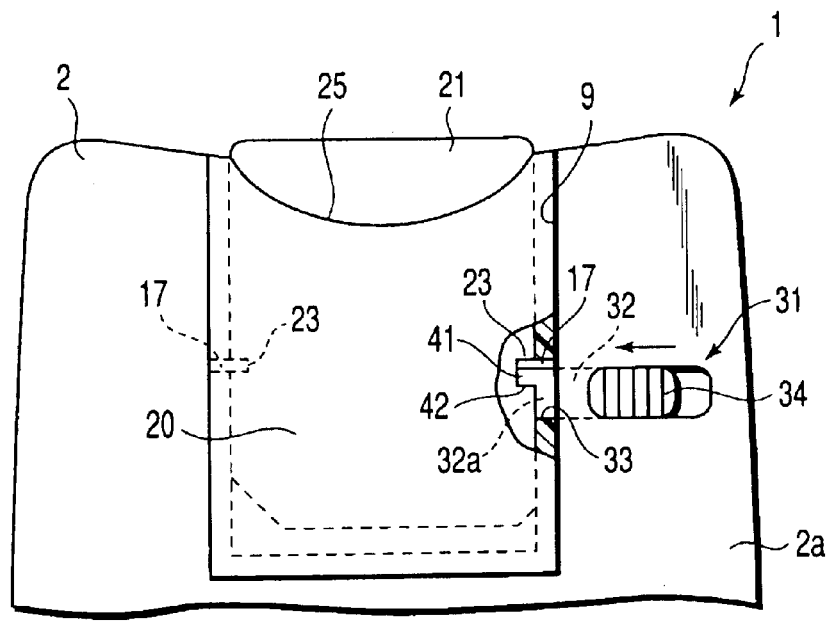
FIG. 10 is a rear view of a PDA according to a second embodiment of the invention with its cardholder locked in the first position by means of a locking tongue.
Figure 11:
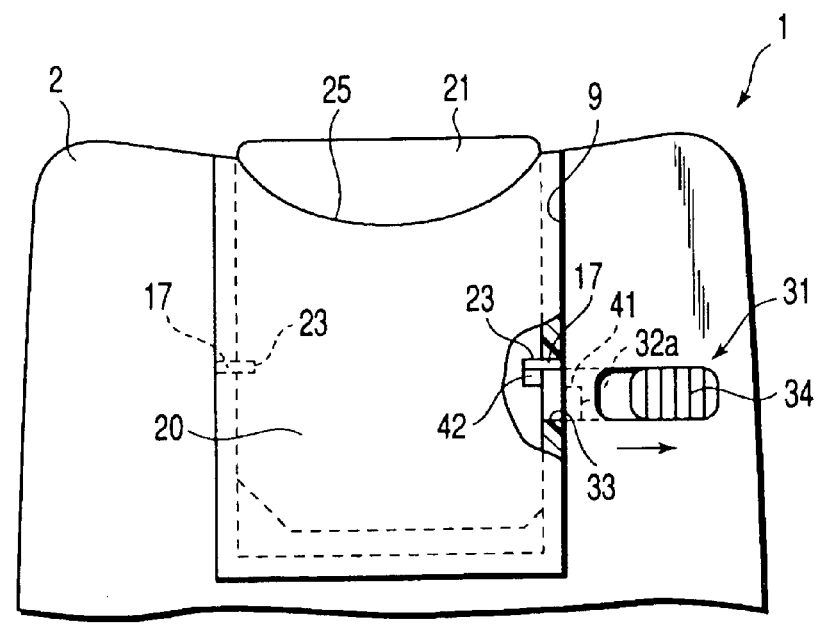
FIG. 11 is a rear view of the PDA according to the second embodiment with the cardholder unlocked or released from the locking tongue.

The present invention is not limited to the first embodiment described above. FIGS. 10 and 11 show a second embodiment of the invention.

According to this second embodiment, the engaging projections 17 and the locking mechanism 31 are combined together to prevent the SD card 21 from slipping off. The second embodiment shares other basic configurations of the PDA 1 with the first embodiment. Therefore, like reference numerals are used to designate like components of the first and second embodiments, and a description of those components will not be repeated.

As shown in FIGS. 10 and 11, the locking tongue 32 of the locking mechanism 31 has an extended portion 41 on its distal end 32a. The extended portion 41 is adapted to penetrate the engaging hole 33 of the cardholder 20 in the first position when the locking tongue 32 is slid to the locking position. The extended portion 41 is located side by side with the right-hand engaging projection 17 as it advances into the cardholder 20.

The right-hand notch 23 of the SD card 21 has a receiving portion 42 that is spread so that the extended portion 41 of the locking tongue 32 can get into it. The receiving portion 42 faces the engaging hole 33 of the cardholder 20 when the SD card 21 is inserted into the cardholder 20 through the card slot 25.

If the locking tongue 32 is slid to the locking position after the cardholder 20, having the SD card 21 therein, is rocked to the first position, according to the configuration described above, the extended portion 41 of the locking tongue 32 gets into the receiving portion 42 of the card 21. Thus, the locking tongue 32 serves both as means for preventing the cardholder 20 from opening and as means for preventing the card 21 from slipping off. In consequence, the SD card 21 can be prevented more securely from slipping off.

Figure 12:
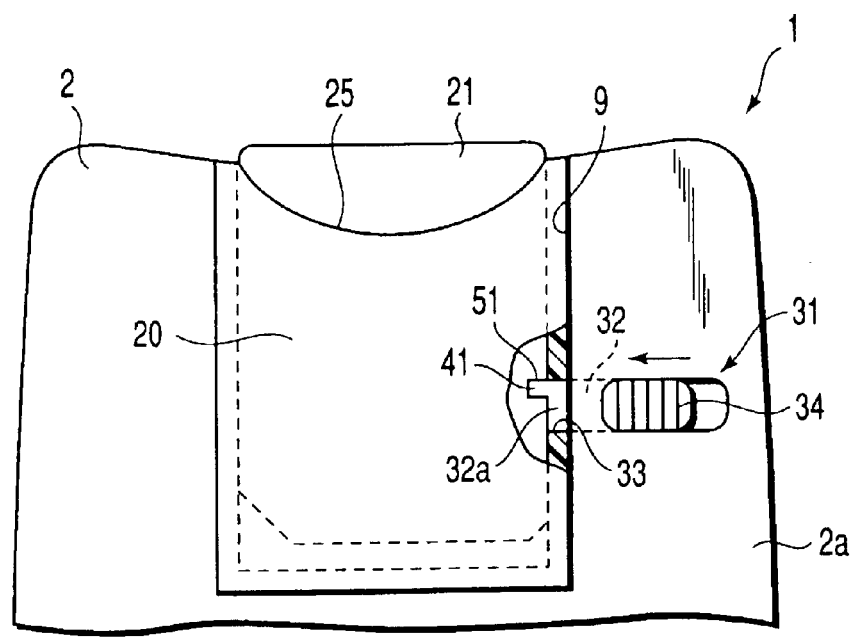
FIG. 12 is a rear view of a PDA according to a third embodiment of the invention with its cardholder locked in the first position by means of the locking tongue.
Figure 13:
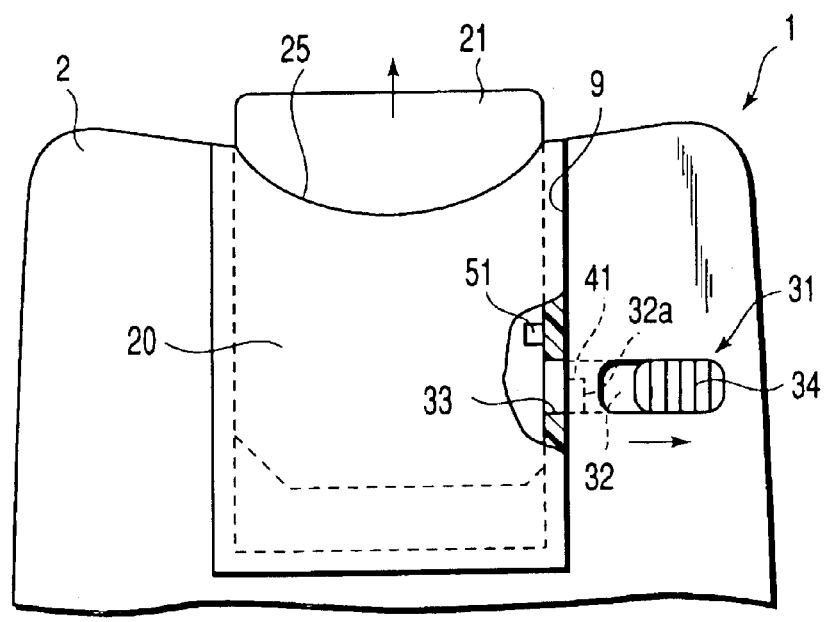
FIG. 13 is a rear view of the PDA according to the third embodiment with the cardholder unlocked or released from the locking tongue.

FIGS. 12 and 13 show a third embodiment of the invention.

The third embodiment differs from the second embodiment in that the SD card 21 is prevented from slipping off by means of the locking mechanism 31. The third embodiment shares other basic configurations of the PDA 1 with the second embodiment.

As shown in FIGS. 12 and 13, the SD card 21 has a notch 51 in its right-hand edge. The notch 51 is adapted to face the engaging hole 33 of the cardholder 20 when the card 21 is fully inserted into the cardholder 20.

If the locking tongue 32 is slid to the locking position with the cardholder 20, having the SD card 21 therein, situated in the first position, therefore, the extended portion 41 of the locking tongue 32 gets into the notch 51 of the card 21 through the engaging hole 33 of the cardholder 20. Accordingly, the locking tongue 32 locks the cardholder 20 in the first position, and at the same time, the SD card 21 is locked lest it slip out of the cardholder 20.

According to this configuration, the holder supporting portion 9 need not be provided with the engaging projections that are caught by the SD card 21, and the through holes that receive the engaging projections need not be formed in the cardholder 20. Thus, the apparatus body 2 and the cardholder 20 can be simplified in construction, and costs can be lowered.

The card used in the present invention is not limited to the SD card. For example, it may be a memory card, such as a solid-state floppy disc card (SSFDC), or some other IC card.

Further, the electronic apparatus according to the present invention is not limited to the PDA, and may be any other apparatus such as a portable computer or portable telephone.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus loaded with a card having contacts, comprising:
    a body having terminals which contact contacts of the card;
    a holder holding the card, the holder being supported by the body and movable between a first position in which the holder is held in the body and the contacts of the card contact the terminals of the body and a second position in which the holder is disengaged from the body and the contacts of the card are separated from the terminals of the body; and
    an engaging portion projecting from the body towards the holder, the engaging portion being engaged to the card in the holder thereby holding the card in the holder when the holder is moved to the first position;
    wherein said card has a notch removably catching the engaging portion, and
    wherein said holder has a through hole penetrated by the engaging portion when the holder is moved to the first position, the through hole being aligned with the notch of the card in the holder.

2. An electronic apparatus according to claim 1, wherein said body has a locking mechanism for locking the holder in the first position.

3. An electronic apparatus according to claim 1, wherein said body has a recess, and said holder is held in the recess when the holder is moved to the first position.

4. An electronic apparatus according to claim 3, wherein said engaging portion projects from the recess.

5. An electronic apparatus according to claim 3, wherein said holder has a card slot for removable insertion of the card and an opening through which the contacts of the card are exposed, and said recess has a plurality of connecting terminals, wherein said connecting terminals are exposed to said recess.

6. An electronic apparatus loaded with a card having contacts, comprising:
    a body having terminals which contact contacts of the card;
    a holder holding the card, the holder supported by the body and movable between a first position in which the holder is held in the body and the contacts of the card contact the terminals of the body and a second position in which the holder is disengaged from the body and the contacts of the card are separated from the terminals of the body; and
    an engaging portion projecting from the body towards the holder, the engaging portion being engaged to the card in the holder thereby holding the card in the holder when the holder is moved to the first position; and
    a locking mechanism set on the body, the locking mechanism including a locking tongue movable between a locking position such that the holder is locked in the first position and an unlocking position such that the holder is unlocked;
    wherein said holder has an engaging hole removably catching the locking tongue, and
    wherein said card has a notch removably catching the engaging portion, and the locking tongue of said locking mechanism has an extended portion penetrating the holder and getting into the notch of the card when the locking tongue is moved to the locking position.

7. An electronic apparatus according to claim 6, wherein said locking mechanism has an operating part for moving the locking tongue to the locking or unlocking position, the operating part being exposed to the outside of the body.

8. An electronic apparatus according to claim 6, wherein said holder has a card slot for removable insertion of the card and an opening through which the contacts of the card are exposed.

9. An electronic apparatus loaded with a card, comprising:
    a body having a corner portion defined by a first wall and a second wall adjacent to each other;
    a recess formed in the first wall and opened to the corner portion;
    a holder holding the card in a removable manner and having a slot into which the card is removably inserted, the holder being supported by the body and movable between a first position in which the holder is held in the recess and a second position in which the holder is disengaged from the recess, and the slot of the holder being exposed outside the body through the corner portion when the holder has moved to the first position; and
    a locking mechanism set on the body, the locking mechanism having a locking tongue movable between a locking position such that the holder is locked in the first position and an unlocking position such that the holder is unlocked and removably caught by the card in the holder when moved to the locking position;
    wherein said holder has an engaging hole penetrated by the locking tongue, and said card has a notch facing the engaging hole, wherein said card removably engages the locking tongue when the card is set in the holder.

* * * * *